Jan. 10, 1967  H. N. JAMES ETAL  3,296,878

VARIABLE SPEED DRIVE SHEAVE

Filed Dec. 31, 1964

INVENTORS:
Howell N. James
BY Edward C. Collins
F. David AuBuchon
ATTY.

United States Patent Office 3,296,878
Patented Jan. 10, 1967

3,296,878
VARIABLE SPEED DRIVE SHEAVE
Howell N. James and Edward C. Collins, Moline, Ill., assignors to International Harvester Company, Chicago, Ill., a corporation of New Jersey
Filed Dec. 31, 1964, Ser. No. 422,590
7 Claims. (Cl. 74—230.17)

This invention relates to pulleys. Particularly the invention relates to a sheave of the class which is mounted on a rotatable shaft to drive an endless belt and which is adjustable to enable the drive speed to be varied.

With evolution in this art, increasingly complex mechanisms have been developed for moving pulley wheel components to and away from each other to vary pulley speed. The increased complexity of the mechanisms has been accompanied by associated increased costs of repair and replacement.

In many implements and machines in which use of pulleys is indicated to vary drive speed, it is essential that adjustment be capable of being made quickly and easily manually. Additionally, after adjustment, it may be required that the adjusted components be positively locked so that the adjustment will hold. Furthermore, many variable speed pulley mechanisms may be subjected to forces which indicate the use of sturdy construction and the avoidance of complicated sensitive equipment.

In a modern harvester thresher, for example, it is desirable to have a variable speed device mounted on the cylinder shaft of the harvester thresher to permit adjustment of the rotational speed of such shaft in accordance with the requirements of various crops to be harvested. In such device, it is also required that the variable speed mechanism be adjustable manually and quickly in accordance with changing character of a given crop being harvested. Furthermore, because of harsh field conditions encountered in harvesting which apply jolting forces on a variable speed pulley, it is imperative to provide a strong lock by which an adjustable pulley will be held in selected positions of adjustment.

To obtain this the present invention contemplates a unique variable speed pulley in which the movable half of the pulley must be transposed towards the stationary half before an adjustment can be made. The belt pressure which tends to spread the pulley halves apart opposes the necessary transposition of the movable pulley half to thus provide a strong lock which is automatically released upon relaxation of the belt pressure.

To the end that simplified construction could be employed in an improved device, teachings which are disclosed in U.S. Patents Nos. 1,738,552, and 2,302,483, were incorporated in the instant invention in combination with novel adjusting and locking means including interlocked scalloped surfaces. By reason thereof, exceedingly fine adjustments in pulley speed are possible, together with a strong positive lock to hold the pulley parts in selected adjusted positions.

The general object of the invention, of course, is the provision of an improved variable speed pulley.

Another object of the invention is the provision in such variable speed pulley of a simplified and rugged construction capable of withstanding the rigors of repeated shock.

A yet further object of the invention is the provision in such a construction of inexpensive components which are easily assemblable with resultant minimized cost.

A still further object of the invention is the provision of improved means for quickly and manually finely adjusting a sheave, whereby finely adjusted speeds are produced, and means for firmly holding said sheave in adjusted positions.

These and other objects, features and advantages of the present invention will become more apparent upon consideration of the following description and appended claims, when considered in conjunction with the accompanying drawings, wherein the same reference character or numeral refers to like or corresponding parts throughout the several views.

Figure 1:
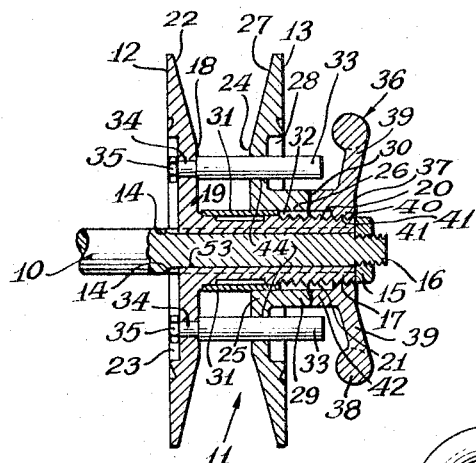
FIG. 1 is a transverse sectional view of a sheave embodying one form of the invention and mounted on a fragmentary end of a shaft, parts being shown in elevation.
Figure 2:
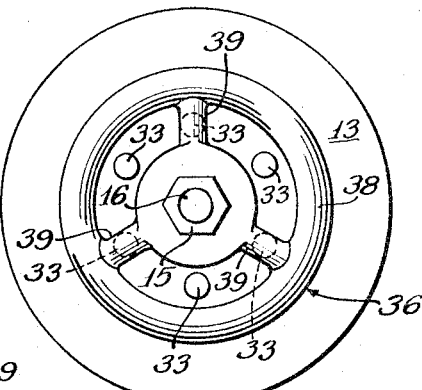
FIG. 2 is an elevational view looking at the right side of FIG. 1.
Figure 3:
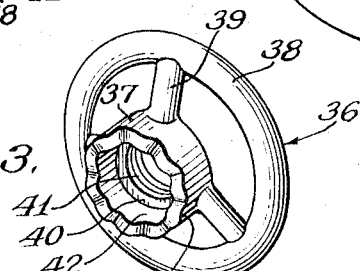
FIG. 3 is a perspective of the adjustable handle looking toward the locking surface.

Referring now more particularly to FIGS. 1, 2 and 3 of the drawings which disclose one embodiment of the invention, there is seen the fragmentary portion of a shaft 10 which provides an axis of rotation for a sheave generally designated by the numeral 11. The sheave 11 comprises a pair of pulley sections 12 and 13 which are spaced apart axially of the shaft 10.

Sheave or first pulley section 12 comprises the fixed section, and it is splined as at 53 to the shaft 10. Inward movement of the fixed pulley section axially of the shaft 10, that is, to the left with respect to FIG. 1, is precluded by reason of the abutments 14 at the end of the keyways comprising the splines 53. Outward movement axially of the shaft 10, that is, to the right with respect to FIG. 1, is precluded by a nut 15 which is threadingly mounted upon a reduced threaded end portion 16 of the shaft 10, and which abuts against the end face of elongated hub extension 17 of the sheave section 12.

The sheave section 12 comprises an annular radial flat 18 which is integral with sheave hub portion 19. The hub extension 17 is integral with hub portion 19 and extends axially about the shaft 10 toward the right with respect to FIG. 1. The outer end portion 20 of the hub extension 17 has external threads 21, the purpose of which will subsequently be described.

The sheave section 12 has an annular peripheral integral flared or sloped rim portion 22 which slopes to the left in FIG. 1 outwardly from the section 12. Said sloped rim portion 22 is disposed in a manner to define a central recess 23 in the outer surface of the sheave section 12, as illustrated at the left portion of FIG. 1.

Sheave or second pulley section 13 is the adjustable section, being slidable longitudinally of shaft 10. Sheave or second pulley section 13 comprises an annular flat 24 which extends radially from its integral hub portion 25. The inner annulus 26 of hub portion 25 is spaced from and disposed about hub extension 17 of the fixed sheave section 12.

Sheave or second pulley section 13 has an annular peripheral flared or sloped rim portion 27 which slopes to the right in FIG. 1 outwardly from the flat 24. Said rim portion 27 defines the peripheral limit of an annular recess 28 inwardly defined by an annular extension 29 of the hub 25.

The axial hub extension 29 extends outwardly from the sheave section 13 toward the right with respect to FIG. 1 axially with respect to the shaft 10. The outer face of the ring forming the end of the hub extension 29 has an erose, undulated, scalloped or wavy surface 30, as illustrated in FIG. 1.

A bushing 31 is rigidly secured to the hub extension 17 between the inner ends of the threads 21 and the flat 18. The bushing 31 provides a smooth surface upon which the inner annulus of the hub 25 can slide. Thereby the adjustable sheave section 13 is slidable or adjustable on the hub extension 17 longitudinally thereof.

A plurality of pins or guides 33 and the like are rigidly secured to sheave section 12 from the flat 18 of which they extend normally longitudinally of shaft. As illustrated in FIGS. 1 and 2, said guides or pins 33 are annularly spaced from each other about the shaft 10. Each of said guides or pins 33 has a reduced end portion 34 which extends through an appropriate aperture therefor provided in the sheave section 12. The end portions 34 are secured by nuts 35 in the conventional fashion.

A manually operable wheel 36 comprising a hub and a rim 38 which are connected together by a plurality of spokes 39 is mounted on the threaded end portion 20 of the hub extension 17. For the purpose of such mounting, the hub 37 is provided with an integral inwardly extending annular flange 40 which has inner threads 41 which mesh with threads 21.

Hub 37 has an annular flange 42 extending longitudinally of shaft 10. Said flange 42 is spaced outwardly from and disposed about the hub extension 17. The inner end face 43 of said flange 42 is undulated, scalloped or provided with waves which are adapted to register with the waves, undulations or scallops 30, whereby the wheel 36 and the sheave section 13 may be locked together to preclude outward movement, that is, movement to the right with respect to FIG. 1, of the sheave section 13.

The manner in which the device illustrated in FIGURES 1, 2 and 3 operates is as follows: When it is desired to increase the effective diameter of the sheave, the belt (not shown) tension is released, sheave section 13 is slid to the left with respect to FIGURE 1, the movement being guided by pins 33, portions of which extend through apertures provided therefor in the sheave section 13. Inasmuch as the pins 33 are rigidly secured to the sheave section 12, neither of said pins will move as the sheave section is slid to the left, nor will fixed sheave section 12 move by reason of abutment 14. Sheave section 13 must be slid past its intended position, to permit handle 36 to be threaded to the left until its approximate position is reached. Sheave section 13 is then slid to the right until faces 43 and 30 engage. In such position, there may or may not be exact registration of the scallops or undulations of the faces, and slight modifications or adjustments of handle 36 will be required until the scallops or undulations are brought into registration. Upon bringing the face 43 into registration with the face 30 and positioning the belt and applying tension thereto, the sheave sections are positively in the relative position and separation of the sheave sections 12 and 13 is precluded. At this point to change the effective diameter of the sheave, sheave section 13 must be moved inwardly towards sheave section 12. Additionally, it is observed that inward movement of the section 13 towards the sheave 12 is precluded by reason of the presence of the normal tension of the pulley belt itself which tends to force the sheave sections apart. Accordingly, no component is required to preclude moving together of the sheave sections 12 and 13.

When it is desired to decrease the effective diameter of the sheave the above procedure is followed except the handle 36 is merely rotated in an opposite direction.

Figure 4:
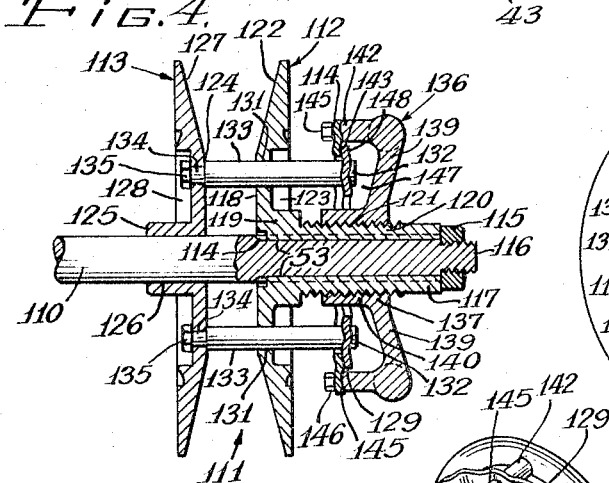
FIG. 4 is a transverse sectional view of a sheave embodying a modified form of the invention and mounted on a fragmentary section of a shaft, parts being shown in elevation.
Figure 5:
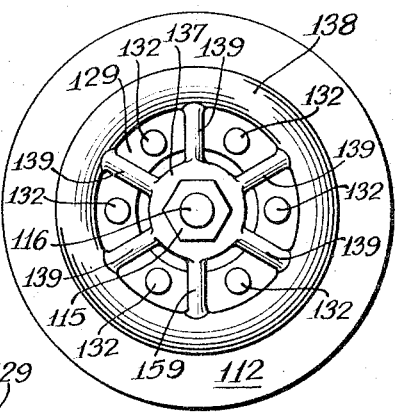
FIG. 5 is an elevational view looking toward the right end of FIG. 4.
Figure 6:
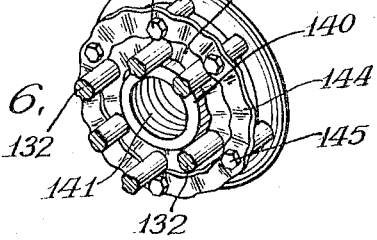
FIG. 6 is a perspective view of the adjustable handle looking toward the locking surface.

A modified form of the invention illustrated in FIGS. 4, 5 and 6 discloses a fragmentary portion of a shaft 110 which provides an axis for rotation for a sheave generally designated by the numeral 111. The sheave 111 comprises a fixed sheave or pulley section 112 and an adjustable sheave or pulley section 113 which is adjustable longitudinally of shaft 110.

The sheave or first pulley section 112 is mounted on the shaft 110 and secured from independent rotation thereon by means of a spline 153. Limitation of the movement of the sheave or first pulley section 112 toward the sheave or second pulley section 113 is by reason of a shoulder 114 defining the limit of the keyway comprising the spline 153. Outward movement of the sheave or first pulley section 112, that is, movement away from the sheave section 113 toward the right with respect to FIG. 4, is limited or precluded by a stop or nut 115 which is threadingly mounted on a threaded end portion 116 of the shaft 110 and which bears against the outer face of a hub extension 117 of sheave 112.

The sheave or first pulley section 112 comprises an annular flat 118 which extends radially from integral hub portion 119 of said sheave or first pulley 112. The hub extension 117 is integral with the hub portion 119 from which said extension extends longitudinally of the shaft 110 away from the sheave section 113. An inner or medial portion 120 of the hub extension 117 is provided with external threads 121, the purpose of which will be hereinafter described.

The sheave or first pulley section 112 has an integral annular flared or sloped rim portion 122 which slopes to the right in FIG. 4. An annular recess 123 is formed at the outer surface of the flat 118 bounded by the sloping portion 122 and the hub 119, as illustrated in FIG. 4.

The sheave or second pulley section 113 comprises an annular flat 124 which extends radially from and is integral with hub portion 125, the inner annulus 126 of which is mounted for sliding the sheave or second pulley section 113 axially of the shaft 110 by any conventional means well known in the art. The sheave or second pulley section 113 has an integral flared or sloping peripheral annular rim portion 127 which extends angularly from the flat 124, as illustrated in FIG. 4. An annular recess 128 is defined by the outer surface of said flat 124, sheave rim portion 127 and the axially extending hub 125, as illustrated to the left of FIG. 4.

A plurality of pins or guides 133 which are spaced annularly from each other are disposed about the shaft 110. The pins 133 extend longitudinally of said shaft 110 and normally away from flat 124 toward sheave or first pulley section 112. A reduced end portion 134 of each of said guides or pins 133 extends through an aperture provided in sheave 113 into recess 128. Said pins or guides 133 are rigidly connected to the slidable or adjustable sheave or second pulley section 113 by means of nuts 135 which are secured on the end portions 134 in the manner illustrated in FIG. 4.

The pins or guides 133 extend through and are slidable in apertures 131 provided in the fixed sheave or first pulley section 112. Inasmuch as apertures 131 are not rotatable independently of shaft 110 by reason of spline 153, the sheave or second pulley section 113 will be restrained from rotation independently of the shaft 110.

A manually operable wheel, generally designated by the numeral 136 and comprising an annular hub 137, a grippable rim 138 and integral connecting spokes 139 connecting said rim 138 with said hub 137, is mounted on the hub extension 117. To effectuate the mounting, hub 137 has an internally threaded annular flange 140 extending longitudinally of shaft 110. The threads 141 of said flange 140 mesh with the threads 121 on the threaded section 120 of hub extension 117.

Extending longitudinally of shaft 110 inwardly from the rim 138 toward the sheave or pulley section 112 is an annular rim extension or spacer 142 which may be formed integrally with said rim 138. A ring or flange 144 disposed about and spaced outwardly from the pins or guides 133 is rigidly secured to the rim extension or spacer 142 by a fastener such as bolts or the like 145, only some of which in FIGS. 4 and 6 have been numbered. An inner annular portion 146 of the ring or flange 144 extends centrally of rim extension or spacer 142. Said portion 146 is provided with scallops, undulations or the like 143 on the surface facing outwardly, that is, on the surface facing toward the spokes 139.

The flange portion 146 together with the handle 136 form therebetween a chamber 147 in which there are disposed the outer end portions 132 of the guide pins 133. A flange or ring 129 disposed in chamber 147 is rigidly secured on the outer end portions 132. Said flange or ring is disposed about and spaced from the hub 140. The peripheral portion 148 of said flange or ring 129 extends radially a distance greater than the inner radius of section 146. Thereby, flange portion 146 and peripheral portion 148 are disposed in overlapping relationship.

The ring 129 has a scalloped or undulated surface 130 facing and adapted to lock against the surface 143. Thereby, when the overlapping or overhanging portions 146 and 148 are brought into engagement and the undulations adjusted into registration, they will lock said rings 144 and 129 together.

Having thus described the details of construction of the form of the invention shown in FIGS. 4, 5 and 6, a brief description of the operation of the modified form now ensues:

To decrease the effective diameter of the sheave, the belt tension is released, section 13 is slid to the right as seen in FIGURE 4 and the handle 136 is rotated to move face 143 towards the sheave 112. Section 113 is then slid to the left such that faces 143 and 130 engage. To obtain registration of the faces 130 and 143 and locking of the scalloped surfaces, fine adjustment of handle 136 may be required.

On the other hand, if it is desired to increase the effective diameter of the pulley, the belt tension is released, the sheave section 113 is manually slid to the right, that is, towards the section 112, passed the approximate position desired. Thereby, faces 130 and 143 are disengaged. In such position, the handle 136 is rotated sufficiently away from the section 112. Thereafter, slight adjustment might be necessary to obtain positive registration or locking of the scalloped or undulated surfaces.

The sheaves shown in FIGURES 1 and 4 are intended to be used in conjunction with one another. When the sheave in FIGURE 1 is closed the belt is not only forced radially out, but is also displaced to the left. At the same time, it is intended that sheave, FIGURE 4, be opened. When this happens, the belt moves towards the center and is also displaced to the left, thus maintaining proper alignment of the belt in the two sheaves. Proper alignment of the connecting belt is assured by constructing the flares 22 and 27 of sheave 11 at the same angle to the sheave axle as flares 122 and 127 of sheave 111 and also constructing the threads 21 and 41 of sheave 11 at the same pitch as threads 121 and 141 of sheave 111.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. An adjustable pulley adapted to be mounted upon a shaft having an axis comprising; a first pulley section having a threaded hub adapted to be fixed to said shaft, a second pulley section including a hub portion adapted to move axially of said shaft and said first pulley section but restricted from relative rotation with respect to said first pulley section, means including an irregular surface formed on the free end of said hub portion rigidly connected to said adjustable pulley section, a threaded member mounted on said threaded hub including a second surface interlockable with said irregular surface and means for moving said threaded member axially to lock and unlock said pulley sections.

2. The device defined in claim 1 in which said threaded member comprises a wheel threadable axially toward and away from said irregular surface, a wheel hub extension integral with said wheel and extending axially therefrom, said second surface defining an end of said wheel hub.

3. An adjustable pulley adapted to be mounted upon a shaft having an axis comprising; a first pulley section having a threaded hub adapted to be fixed to said shaft, a second pulley section adapted to move axially of said shaft and said first pulley section but restricted from relative rotation with respect to said first pulley section, means including guide pins extending normally outwardly from said adjustable pulley section, and a ring having an irregular surface rigidly connected to said guide pins, a threaded member mounted on said threaded hub including a second surface interlockable with said irregular surface and means for moving said threaded member axially to lock and unlock said pulley sections.

4. The device defined in claim 3 in which said threaded member comprises a wheel threadably axially toward and away from said fixed pulley section, a flange carried by said wheel and having an inner portion overhanging said ring, said inner portion defined by said second surface.

5. The device defined in claim 4 in which said inner portion is disposed between said fixed pulley section and said ring, whereby said pulley sections are locked upon movement of said ring away from the fixed pulley section.

6. An adjustable pulley system including first and second aligned sheaves adapted to be mounted upon shafts having axes comprising; said first and second sheaves each including a first pulley section having a threaded hub adapted to be fixed to said shaft, a second pulley section adapted to move axially of said shaft and said first pulley section but restricted from relative rotation with respect to said first pulley section, means including an irregular surface rigidly connected to said adjustable pulley section, a threaded member mounted on said threaded hub including a second surface interlockable with said irregular surface, means for moving said threaded member axially to lock and unlock said pulley sections, said first pulley sections being offset laterally from each other whereby when the effective diameter of said first sheave is increased it causes the belt to be shifted in the given direction along the shaft axis and whereby when the effective diameter of said second sheave is decreased it causes the belt to be shifted in said given direction along the shaft axis.

7. The invention as set forth in claim 6 wherein the pitch of the threads on said threaded hubs and said threaded members are equal whereby equal adjustment of said threaded members will displace said first and second sheaves equal distances.

References Cited by the Examiner
UNITED STATES PATENTS 2,245,695   6/1941   Mantle _____ 74—230.17
3,132,529   5/1964   Haubenestel _____ 74—230.17
3,180,163   4/1965   Robertson _____ 74—230.17

FRED C. MATTERN, JR., Primary Examiner.

DAVID J. WILLIAMOWSKY, Examiner.

L. H. GERIN, Assistant Examiner.